US007215252B2

(12) United States Patent
Schenck

(10) Patent No.: US 7,215,252 B2
(45) Date of Patent: May 8, 2007

(54) PROXIMITY SENSOR

(75) Inventor: Robert A. Schenck, Hebron, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 108 days.

(21) Appl. No.: 10/869,170

(22) Filed: Jun. 16, 2004

(65) Prior Publication Data

US 2005/0280549 A1 Dec. 22, 2005

(51) Int. Cl.
*G08B 21/00* (2006.01)

(52) U.S. Cl. .................... 340/686.1; 324/623; 324/637

(58) Field of Classification Search ............. 340/686.1; 324/623, 637, 638, 639, 640, 641, 642, 643, 324/644, 624
See application file for complete search history.

(56) References Cited

U.S. PATENT DOCUMENTS 4,346,383 A * 8/1982 Woolcock et al. .......... 342/127
4,413,519 A * 11/1983 Bannister et al. ............. 73/660
4,632,635 A * 12/1986 Thoman et al. ............... 415/14
4,896,537 A * 1/1990 Osborne ...................... 73/660
5,459,405 A * 10/1995 Wolff et al. ................. 324/644
5,818,242 A * 10/1998 Grzybowski et al. ....... 324/642
6,273,671 B1 * 8/2001 Ress, Jr. ........................ 415/1
6,949,922 B2 * 9/2005 Twerdochlib et al. .. 324/207.16
2005/0088171 A1 * 4/2005 Gualtieri ................ 324/207.26

* cited by examiner

*Primary Examiner*—Jeffery Hofsass
*Assistant Examiner*—Edny Labbees
(74) *Attorney, Agent, or Firm*—Carlson, Gaskey & Olds

(57) ABSTRACT

A proximity sensor includes an antenna having a resonant frequency selected to correspond to a resonant frequency associated with a selected dimension of an item of interest. In one example, the antenna is selected to have a resonant frequency corresponding to a resonant frequency associated with the width of a turbine blade. The amount of electromagnetic coupling between the item of interest and the antenna provides an indication of the proximity or distance between them. Several embodiments for incorporating such a structure into a gas turbine air seal are disclosed.

22 Claims, 4 Drawing Sheets

CONTROL
28
24
20
26
ITEM
22
$\lambda/2$

λ1 /2
22'
56
50
54
5A
α
24
58
70
5A 62
52

72
54
24
L
52
70

62

PROXIMITY SENSOR

The U.S. Government has a paid-up license in this invention and the right in limited circumstances to require the patent owner to license others on reasonable terms as provided for by the terms of Contract No. F33615-98-C-2801 awarded by the United States Air Force.

FIELD OF THE INVENTION

This invention generally relates to determining position information regarding an item relative to a sensor.

DESCRIPTION OF THE RELATED ART

There are a variety of situations where detecting the position of an item is useful for control or maintenance issues, for example. One such situation is within a gas turbine engine where the distance or clearance between turbine blades and a blade outer air seal has a direct impact on the efficiency of the turbine. Turbines are initially designed and built with a specific gap or clearance between the tips of the blades and the air seal inner surface. Over time, the blade tips or the air seal surface may wear, which results in an increased gap. Eventually, increases in the gap decrease the deficiency to a level where repair or replacement is desirable One sensor arrangement that has been proposed for detecting the distance between the blade tips and the air seal inner surface is shown in U.S. Pat. No. 5,818,242. Other sensor designs have been proposed. One difficulty associated with previously proposed sensors is that they require operation at an extremely high frequency, which cannot be readily accomplished in many situations. Sensor designs that rely upon optical sensors typically become dirty in the turbine environment so that such sensors cannot operate effectively for more than a short time. Other proposed designs utilizing eddy current techniques or capacitive probes tend to fail to perform in the extremely high temperatures associated with many turbine arrangements.

There is a need for an improved sensor arrangement for determining changes in the clearance between turbine blade tips and the inner surface of the air seal. Further, there is a need for an improved proximity sensor for a variety of applications. This invention addresses that need in a unique manner.

SUMMARY OF THE INVENTION

One example sensor includes an antenna that has a resonant frequency corresponding to a resonant frequency associated with a selected dimension of the item to be detected. A controller excites the antenna to radiate at least one frequency near the item resonant frequency and determines a proximity of the item to the antenna based on an amount of electromagnetic coupling between the antenna and the item.

One example turbine assembly includes a plurality of turbine blades that are supported to rotate. An air seal generally surrounds an outer edge of the blades with a spacing between the edges of the blades and the air seal. An antenna is supported by the air seal and has a resonant frequency that corresponds to a resonant frequency associated with a selected dimension of the blades.

In one example, the antenna resonant frequency corresponds to a half wave length of a resonant frequency of a width of the blades.

An example method of determining a position of an item that has at least one dimension with an associated resonant frequency includes providing an antenna having a resonant frequency corresponding to the resonant frequency associated with the item dimension. A proximity of the item to the antenna is determined based on an amount of electromagnetic coupling between the antenna and the item.

In the example arrangements, a sympathetic radio frequency resonance in the item is detected for making the proximity determination. The electromagnetic coupling between the antenna and the item results in any resonance effect in the item being reflected back to the sensor in a manner that the degree of coupling is proportionate to the proximity of the item to the antenna. Coupling the sympathetic resonance effect in the item alters the resonant frequency of the coupling structure. By determining the resultant resonant frequency, the proximity of the item to the antenna can be determined.

The various features and advantages of this invention will become apparent to those skilled in the art from the following detailed description of the currently preferred embodiments. The drawings that accompany the detailed description can be briefly described as follows.

DETAILED DESCRIPTION

Figure 1:
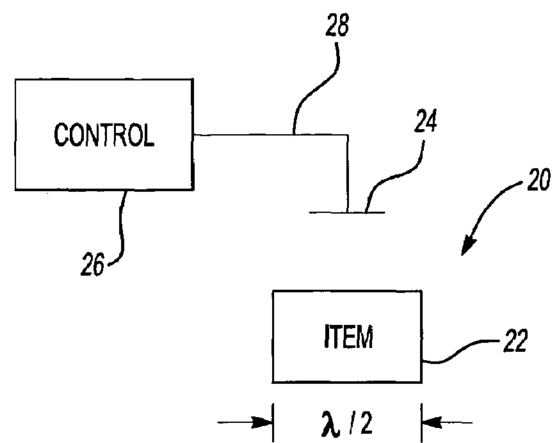
FIG. 1 schematically illustrates a proximity detector arrangement designed according to an embodiment of this invention.

FIG. 1 schematically shows a proximity sensor 20 for detecting position information regarding an item 22. In this example, an antenna 24 is selected to have a resonant frequency that corresponds to a resonant frequency associated with a selected dimension of the item 22. In the example of FIG. 1, a width of the item 22 has a physical dimension that corresponds to a free space half wave length ($\lambda/2$) of a resonant frequency. The resonant frequency of the antenna 24 in one example is selected to be close to but not exactly the same as the resonant frequency associated with the selected dimension of the item 22. The antenna 24 induces sympathetic electromagnetic fields along the selected dimension of the item 22. In one example, the resonant frequency of the antenna 24 is greater than that associated with the selected dimension of the item 22.

The antenna 24 need not take a conventional antenna configuration. In examples to be described below, various coupling structures operate as an antenna for radiating electromagnetic energy toward the item 22 to cause the sympathetic resonance effect in the item 22. Therefore, the term "antenna" as used in this document should be understood to include any coupling structure useful for radiating or receiving electric signals or fields.

In the example of FIG. 1, a controller 26 excites the antenna 24 to radiate electromagnetic energy toward the item 22. A transmission line 28 having a coax cable coupling allows the controller 26 to drive the antenna 24 and allows the controller 26 to receive information to interpret regarding the sympathetic resonant effect in the item 22 for making a position determination. In one example, the controller 26 determines a distance between the antenna 24 and the item 22 based upon the amount of coupling between the antenna 24 and the item 22 at a given frequency.

Figure 2:
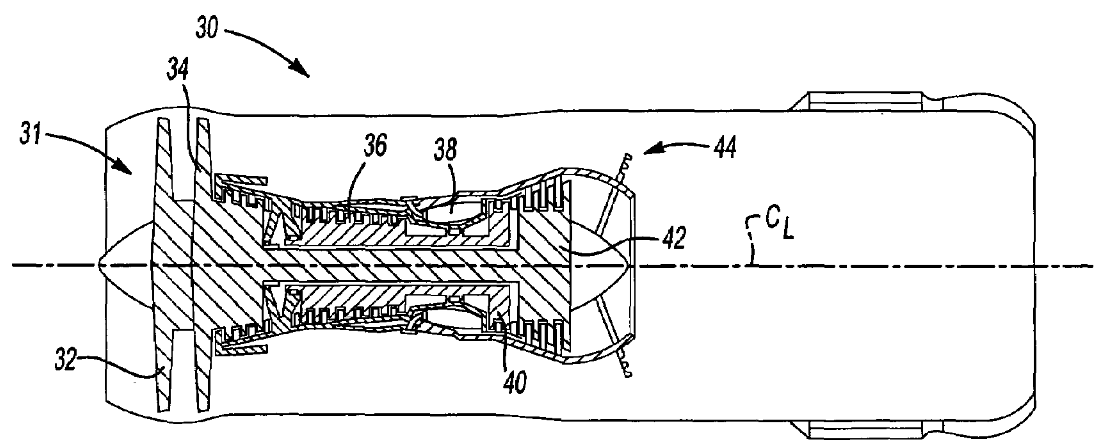
FIG. 2 is a cross-sectional illustration schematically showing a gas turbine engine with which an embodiment of this invention may be used.

One example use for a sensor as schematically shown in FIG. 1 is within a gas turbine engine 30. FIG. 2 schematically shows selected portions of a gas turbine engine 30 including an inlet 31, a fan section 32, a low pressure axial compressor 34, a high pressure axial compressor 36, a burner section 38, a high pressure turbine section 40, a low pressure turbine section 42 and an after burner 44. One portion of the gas turbine engine 30 that is subject to wear and changes in the radial gap between the turbine blade tips and the corresponding air seal surface is the high pressure turbine section 40. The high temperatures and high pressures associated with this section make it a good candidate for utilizing a proximity detector designed according to an embodiment of this invention. Reliable detection of wear in the blade or air seal surfaces that indicate an increasing gap between them allows for longer intervals between overhaul or replacement of the turbine assembly. Additionally, reliable information regarding operation of the high pressure turbine section 40 allows for early detection of potential wear situations to allow for more efficient and economical troubleshooting or repair.

Figure 3:
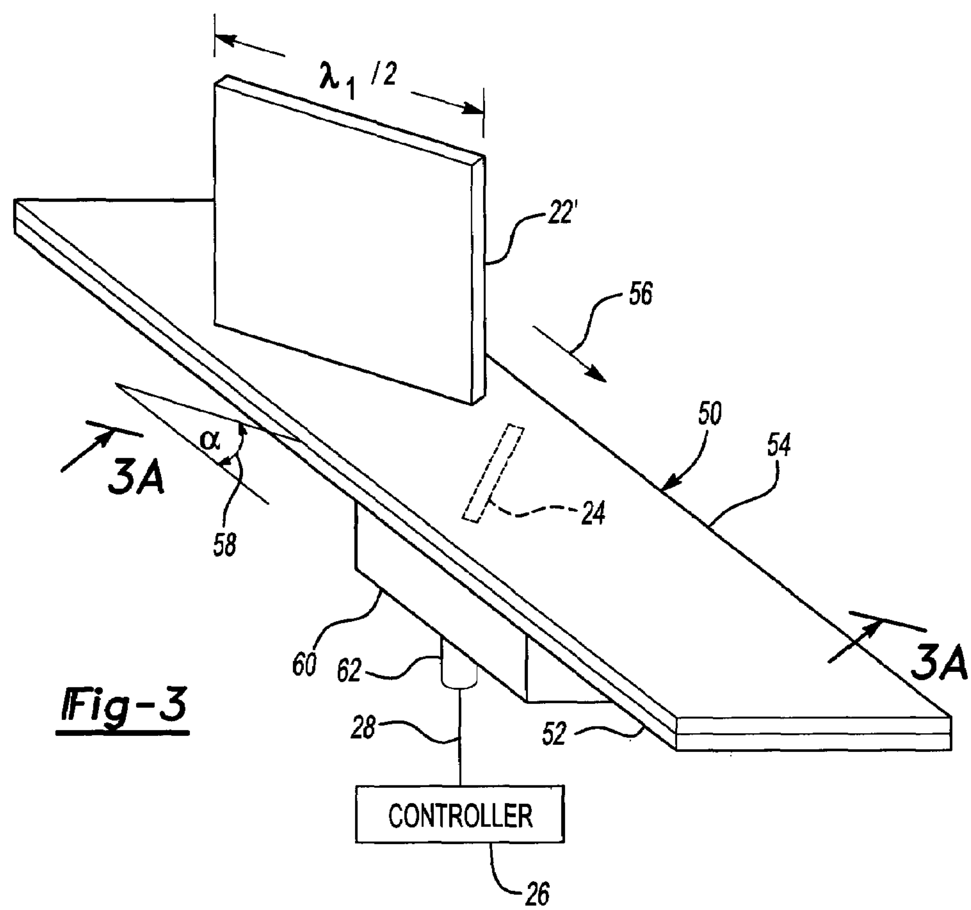
FIG. 3 schematically illustrates selected portions of a gas turbine engine and one example embodiment of a sensor arrangement.
Figure 3A:
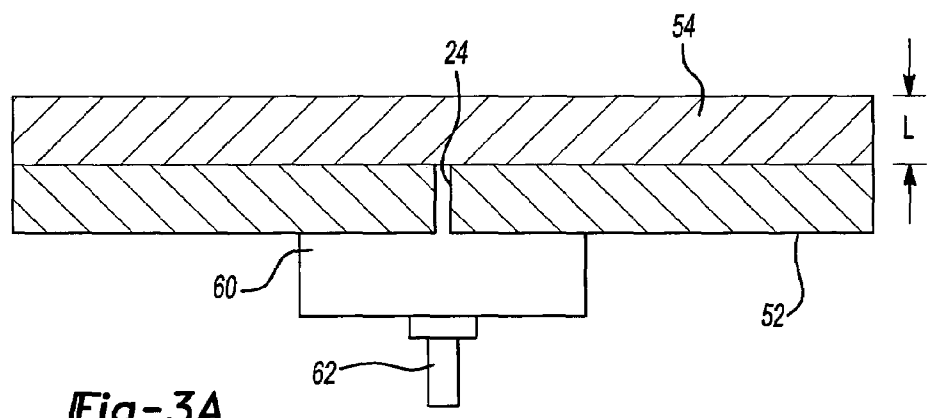
FIG. 3A is a cross-sectional illustration taken along the lines 3A—3A in FIG. 3.

FIGS. 3 and 3A schematically illustrate one example arrangement where a proximity sensor designed according to an embodiment of this invention is used in a gas turbine assembly. In the example of FIG. 3, a portion of one turbine blade 22' is shown along with a portion of the blade outer air seal 50. In this example, the air seal 50 includes a substrate layer 52 made of known ceramic materials. An inner surface layer 54, which is often called a thermal barrier coating, is also made of known materials. In most instances, the inner surface layer 54 comprises materials having a dielectric constant that is known or can be determined. In one example, the resonant frequency of the antenna is approximately 10% greater than that associated with the selected dimension of the item 22.

In the example of FIG. 3, the antenna 24 is a slot formed in the substrate layer 52 beneath the inner surface layer 54. The slot acts as an antenna 24 in a known manner because it corresponds to a missing piece of the material of the substrate layer 52.

In the example of FIG. 3, the slot 24 is oriented to be perpendicular to the width or other selected dimension of the blade 22' that is used for determining the resonant frequencies used during proximity sensing. In the example of FIG. 3, the blade 22' moves generally as shown by the arrow 56 and has a pitch angle $\alpha$ shown at 58. The slot antenna 24 in this example is aligned perpendicular to the pitch angle $\alpha$.

In the example of FIGS. 3 and 3A, a resonant cavity 60 is associated with the air seal substrate layer 52 to provide an appropriate amount of resonance within the cavity 60 for operation of the slot antenna 24. A conventional coaxial cable coupling 62 allows the controller 26 to excite the antenna 24 in a manner that it radiates electromagnetic energy toward the blade 22' as the blade moves past the slot.

By relying upon the natural resonant frequency associated with a selected dimension (i.e., width) of the blade 22', the example arrangement allows for determining proximity based upon the amount of coupling between the antenna 24 and the blade width.

The controller 26 operates in a known manner to excite electromagnetic waves in the cavity 60. As these waves radiate from the slot antenna 24, the impedance and resonant frequency of the slot antenna 24 will be affected by the proximity of the blade 22' relative to the antenna 24 and the thickness of the inner surface layer 54. In one example, the frequency of exciting the slot antenna is selected to match the effective half wave length ($\lambda/2$) of the turbine blade 22' tip width.

One advantage of this example is that the slot antenna 24 is flush with the surface of the air seal substrate layer 52, which means that no separate material is required and the antenna 24 is embedded in the substrate layer, itself.

The antenna 24 is designed to induce sympathetic electromagnetic fields along the selected dimension of the item 22. The self-resonant frequency of the antenna 24 in one example is greater than the resonant frequency associated with the blade width. The coupling between the item and the antenna 24 is significantly affected by the amount of space between them. The controller 26 in one example includes a model of a resonant element having lumped constants of inductances, capacitances and resistance so that the controller is able to interpret the coupling information to make a proximity determination using known relationships.

When the antenna 24 and the item 22 are coupled using a magnetic coupling, the degree of coupling is in the form of mutual inductance with the amount of mutual inductance being a function of the proximity between them. The mutual inductance will couple the complex impedance of the item 22 to the transmission line coupling structure. The impedance of the antenna 24 at the transmission line 28 will then be a function of the mutual inductance. Therefore, the self-resonant frequency of the antenna 24 will be altered by the presence and degree of coupling with the item 22. At the resultant resonant frequency, the impedance will be purely resistive, absorbing incident energy from the transmission line 28.

The radio frequency techniques used for the example of FIG. 1 have a substantial advantage compared to prior arrangements because they are not dependent upon the relative phase of energy reflected back from the item 22. Instead, the combination of the antenna 24 and the electromagnetically coupled item 22 along the selected dimension will result in a complex impedance that is matched to the connected transmission line 28 at particular resonant frequencies. These resonant frequencies are a function of the spacing between the antenna 24 and the item 22. At the resonant frequencies, the resulting impedance is purely resistive.

By selecting different frequencies for exciting the antenna 24, the impedance at resonance (i.e., during coupling with the item 22) will match that of the transmission line 28. When a signal source is connected to the transmission line 28 at the resonant frequency, most of the incident energy is absorbed by the antenna 24. At this point, there is a minimum or null in the amplitude of the signal reflected from the item 22. The controller 26 only measures the reflected signal in one example. The controller 26 searches for the resonant frequency by exciting the antenna 24 with a plurality of frequencies and the controller seeks a null in the detected return or reflected signal. In this example, finding the null value allows the controller 26 to identify the resonant frequency at which the impedance becomes purely resistive, which corresponds to the resonant frequency at which the item 22 proximity is determined. Finding the resonant frequency and using that as a determination of proximity between the item 22 and the antenna 24 represents a significant advancement in the art, in part, because it simplifies processing information for making a proximity determination. With the described example, there is no need for relative phase detection and, therefore, no effects based upon the length of the transmission line 28, for example.

Figure 4:
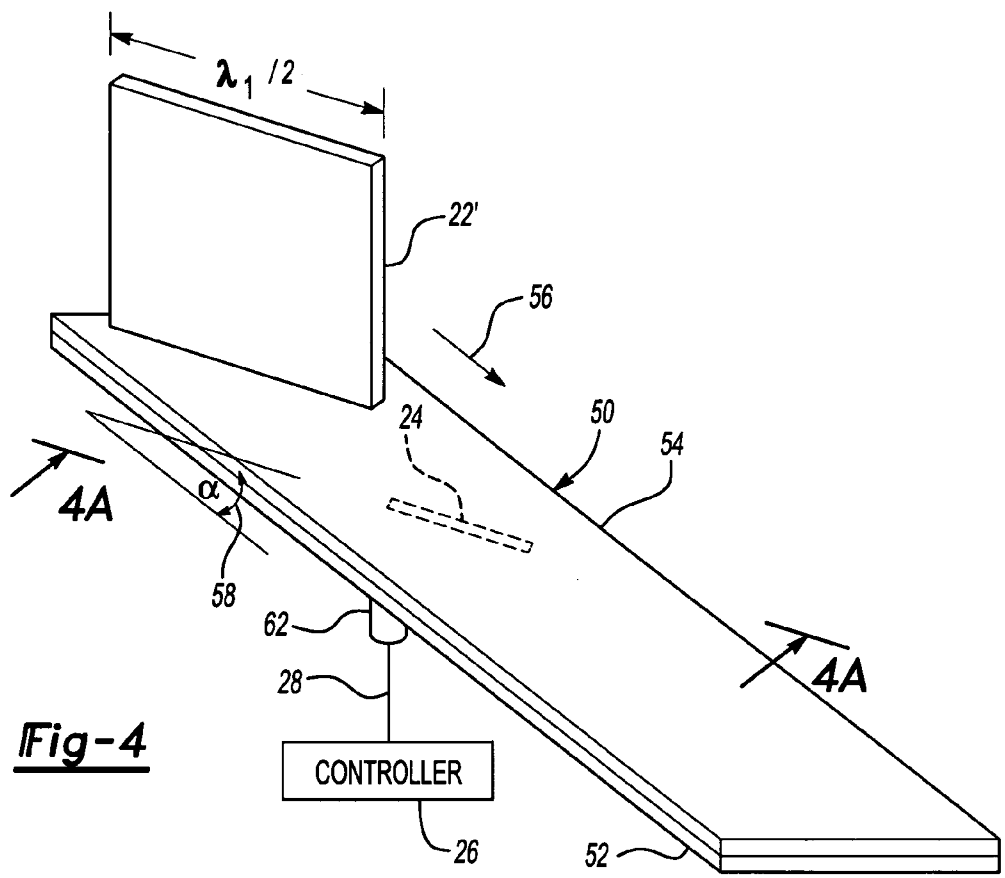
FIG. 4 schematically illustrates selected portions of a gas turbine engine with another example embodiment of a sensor arrangement.
Figure 4A:
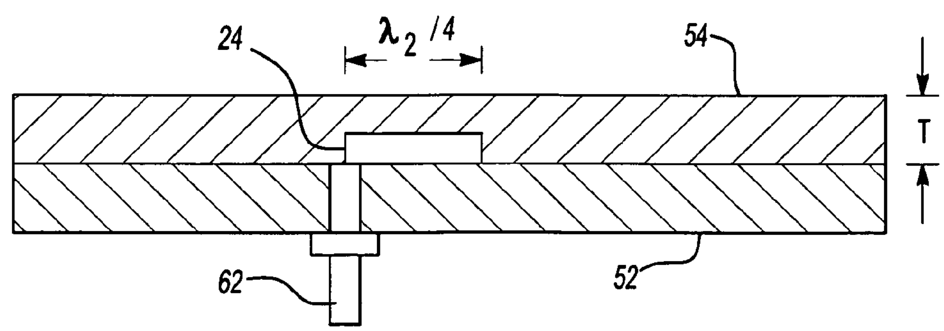
FIG. 4A is a cross-sectional illustration taken along the lines 4A—4A in FIG. 4.

FIGS. 4 and 4A schematically show another sensor embodiment that is useful within a gas turbine environment. In this example, the coaxial cable coupling 62 is fitted through the substrate layer 52 of the air seal. A conductive loop antenna such as a microstrip is mounted above and parallel to the substrate layer 52. In the illustrated example, as best appreciated from FIG. 4A, the conductive loop is supported within the inner surface layer 54, which is dielectric in nature. In one example, the loop 24 is fabricated at a height of approximately 0.02 inches above the substrate layer 52 and is completely covered by the inner surface layer 54. One end of the loop antenna 24 is coupled to the coaxial feed through element while the other end of the loop is terminated in the substrate layer 52.

In the example of FIG. 4, the conductive loop antenna 24 is parallel to the pitch angle $\alpha$ shown at 58 of the blade tips as they rotate within the turbine. The length of the loop in one example is selected to provide optimum electromagnetic coupling with the width of each blade tip. The thickness of the blade tip does not have an effect on the measurement of the example embodiment. The length of the loop in one example is selected to provide a convenient alteration of feed impedance versus the gap between the item 22 (i.e., the blade tip) and the antenna 24. As in the example of FIGS. 1 and 3, the feed point impedance and resonant frequency of the loop antenna 24 is a function of proximity between the blade 22' and the antenna 24. The feed point impedance and resonant frequency are also a function of the thickness and dielectric constant of the inner surface layer 54.

Having the loop antenna 24 parallel to the blade pitch angle $\propto$ shown at 58, reduces potential interaction between the loop antenna 24 and more than one blade at a given time.

Figure 5:
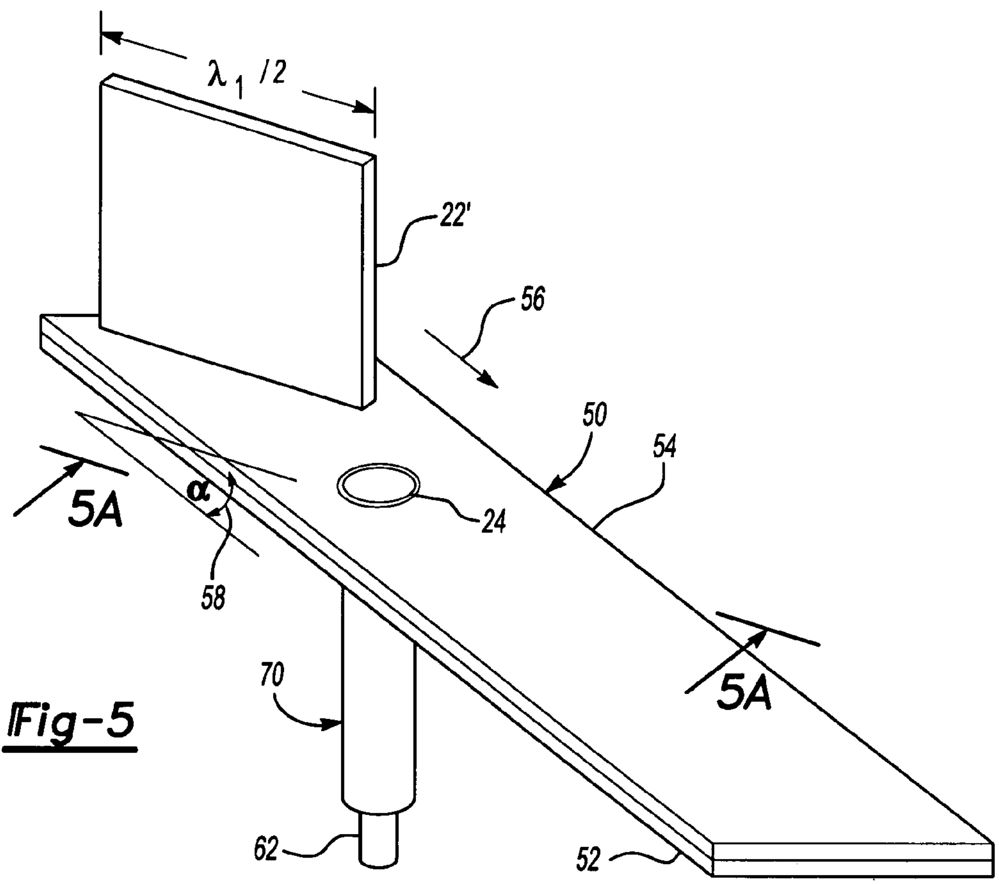
FIG. 5 schematically illustrates selected portions of a gas turbine engine with another embodiment of a sensor
Figure 5A:
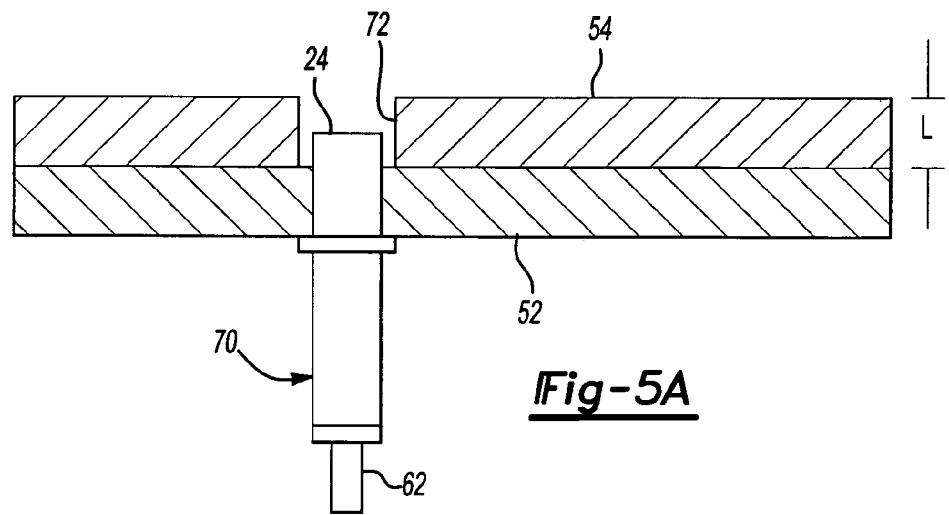
FIG. 5A is a cross-sectional illustration taken along the lines 5A—5A in FIG. 5.

FIGS. 5 and 5A show another example arrangement where an invasive probe assembly 70 has a relatively short conductive loop antenna 24 in the end tip of the probe assembly. In this example, the probe assembly 70 has a portion that is inserted through and secured to the substrate layer 52. The conductive loop antenna 24 may be at or below the plane of the substrate layer 52. In one example, the conductive loop antenna 24 is embedded within a thermally productive material to withstand the high temperatures associated with a high pressure portion of a turbine. One example includes a means for locking the position of the probe assembly 70 relative to the substrate structure. The alignment between the conductive loop antenna 24 and the pitch of the item 22 (i.e., the blade tip) can be secured in a selected alignment. In the example of FIG. 5, the loop 24 is aligned parallel with the blade pitch angle $\propto$ shown at 58.

As can be appreciated from this description, a variety of coupling structure configurations may be implemented, depending on the needs of a particular situation. Given this description, those skilled in the art will be able to select an appropriate configuration to meet the needs of their particular situation. By selecting the antenna 24 to have a resonant frequency corresponding to the resonant frequency associated with a selected dimension of the item 22, the disclosed examples provide a more reliable sensor than was previously possible. Moreover, further information can be gained from any one of the example embodiments.

In one example, the controller 26 monitors an amount of time between the passage of each item 22 past the antenna 24. A pulse is associated with each blade, for example. A time between adjacent pulses indicates the time between the movement of the blades past the antenna 24. When there are variations in the time between pulses of selected ones of the blades, that may provide an indication of vibration or uneven wear in the turbine assembly. A controller having such a capability can provide an early indication of a worn or wearing bearing within the turbine assembly, for example. Such an indication may be useful for alerting a technician of the need for service prior to failure of the bearing in a manner that would cause further complications in the turbine, resulting in more expensive repair or replacement costs at a later date. A variety of techniques for utilizing the information from the sensor 20 to make such determinations could be used in a system designed according to an embodiment of this invention The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A proximity sensor, comprising:

an antenna having a resonant frequency corresponding to a resonant frequency determined by a selected dimension of a selected item; and a controller that excites the antenna to radiate at least one frequency near the item resonant frequency and determines a proximity of the item to the antenna based on an amount of electromagnetic coupling between the antenna and the item.

2. The proximity sensor of claim 1, wherein the antenna resonant frequency is greater than the resonant frequency associated with the item dimension.

3. The proximity sensor of claim 2, wherein the antenna resonant frequency is approximately 10% greater than the resonant frequency associated with the item dimension.

4. The proximity sensor of claim 1, wherein the antenna resonant frequency corresponds to a half wavelength of the resonant frequency associated with the item dimension.

5. The proximity sensor of claim 1, wherein the controller excites the antenna at a plurality of test frequencies near at least one of the resonant frequencies, determines the frequency at which the amount of coupling is greatest and uses the determined frequency to determine the proximity.

6. The proximity sensor of claim 1, wherein the controller determines a proximity of a plurality of items that repeatedly pass by the antenna;

determines a time between movement of selected ones of the items past the antenna at a rotational speed; and determines if there are any variations in the time at the same rotational speed.

7. The proximity sensor of claim 1, wherein the antenna comprises at least one of a slot formed in a substrate material, a microstrip or a conductive element.

8. The proximity sensor of claim 1, wherein the selected item is at least one turbine blade and the selected dimension is a width of the blade.

9. A turbine assembly, comprising:

a plurality of turbine blades supported to rotate;

an air seal generally surrounding an outer edge on the blades with a spacing between the edges of the blades and the air seal; and an antenna supported by the air seal and having a resonant frequency that corresponds to a resonant frequency determined by a selected dimension of the blades.

10. The assembly of claim 9, wherein the antenna resonant frequency corresponds to a half wavelength of a resonant frequency associated with a width of the blades.

11. The assembly of claim 10, wherein the width of the blades extends at an oblique angle relative to an axis of rotation of the blades and the antenna is oriented to be one of perpendicular or parallel to the oblique angle.

12. The assembly of claim 9, wherein the antenna resonant frequency is greater than the resonant frequency associated with the selected dimension.

13. The assembly of claim 12, wherein the antenna resonant frequency is approximately 10% greater than the resonant frequency associated with the selected dimension.

14. The assembly of claim 9, including a controller that excites the antenna to radiate at least one frequency near the resonant frequency associated with the selected dimension and the controller determines a proximity of the blade to the antenna based on an amount of electromagnetic coupling between the antenna and the blade.

15. The assembly of claim 14, wherein the controller excites the antenna at a plurality of test frequencies, determines the frequency at which the amount of coupling is greatest; and uses the determined frequency to determine the proximity.

16. The assembly of claim 14, wherein the controller determines a time between movement of selected ones of the blades past the antenna at a rotational speed and determines if there are any variations in the time at the same rotational speed.

17. The assembly of claim 9, wherein the air seal includes at least a substrate layer and a layer of material having dielectric properties adjacent the substrate layer and wherein the antenna comprises at least one of a slot formed in the substrate layer, a microstrip supported at least partially in the layer of material or a conductive element supported near the layer of material.

18. A method of determining a position of an item having at least one dimension with an associated resonant frequency, comprising:

providing an antenna having a resonant frequency corresponding to the resonant frequency determined by the item dimension; and determining a proximity of the item to the antenna based on an amount of electromagnetic coupling between the antenna and the item.

19. The method of claim 18, including exciting the antenna at a plurality of frequencies near the item resonant frequency associated with the item dimension;

determining which of the plurality of frequencies results in a maximum amount of coupling between the antenna and the item; and determining the proximity of the item based on the determined frequency.

20. The method of claim 18, wherein the item is a turbine blade and the dimension is a width of the blade.

21. The method of claim 20, including supporting the antenna on an air seal and determining a distance between an edge of the blade and a surface of the air seal.

22. The method of claim 18, including determining an amount of vibration of the item relative to the antenna.

* * * * *